United States Patent [19]

Norval et al.

[11] 4,356,159
[45] Oct. 26, 1982

[54] METHOD OF RECOVERING BROMINE FROM METHYL BROMIDE

[75] Inventors: Stephen V. Norval, Guisborough; Peter J. V. Jones, Stockton-on-Tees, both of England

[73] Assignee: Imperial Chemical Industries Limited, London, England

[21] Appl. No.: 210,753

[22] Filed: Nov. 28, 1980

[30] Foreign Application Priority Data

Dec. 13, 1979 [GB] United Kingdom ............... 7942974

[51] Int. Cl.³ .............................................. C01B 7/12
[52] U.S. Cl. .................................... 423/481; 562/514
[58] Field of Search ...................... 423/240, 481, 502; 562/514

[56] References Cited

U.S. PATENT DOCUMENTS

| | | | |
|---|---|---|---|
| 3,140,155 | 7/1964 | Cull et al. | 423/481 |
| 3,705,010 | 12/1972 | Davis | 423/502 |
| 3,972,979 | 8/1976 | Kageyama | 423/502 X |
| 4,059,683 | 11/1977 | Lindberg et al. | 423/502 X |

OTHER PUBLICATIONS

Bond et al., "*Journal App. Chem.*"; vol. 25; 1975, pp. 241–248.
"Chem. Abst." vol. 29, 1978; 12–1973.

*Primary Examiner*—G. O. Peters
*Attorney, Agent, or Firm*—Cushman, Darby & Cushman

[57] ABSTRACT

A method for the recovery of the bromine content of methyl bromide as bromine or hydrogen bromide comprises oxidizing the methyl bromide over a noble metal catalyst. The production of hydrogen bromide is favored by the inclusion of a source of hydrogen.

10 Claims, No Drawings

METHOD OF RECOVERING BROMINE FROM METHYL BROMIDE

The present invention relates to a method of recovering the bromine content of methyl bromide.

Methyl bromide is a colourless, odourless organic compound which boils at 4° C. at atmospheric pressure. It is poisonous and finds wide use as a fumigant and also has applications as an organic intermediate. We have found that methyl bromide is formed when substituted aromatic compounds are oxidised to carboxylic acids using a catalyst comprising a heavy metal and a source of bromine such as hydrogen bromide (see our co-pending British Patent Application No. 49614/78) which states as follows.

The aromatic compound is preferably substituted by an alkyl, hydroxyalkyl or a formyl group. Particularly suitable alkyl groups are lower ($C_1$ to $C_8$) alkyl groups e.g. methyl, ethyl and isopropyl groups. Particularly suitable hydroxyalkyl groups are hydroxymethyl and hydroxyethyl groups. One, two or more such groups may be present in the aromatic nucleus and the groups may be the same or different. The aromatic nucleus may, for example, be a benzene or naphthalene nucleus. Particularly suitable aromatic compounds to be oxidized are toluene, ethylbenzene, isopropylbenzene, o-, m- and p-xylene, cumene, pseudocumene, the isomeric diisopropylbenzenes, durene, mesitylene, hydroxymethylbenzene, hydroxyethylbenzene, bis-hydroxymethylbenzenes, benzaldehyde, the isomeric tolualdehydes and 2,6-dimethylnaphthalene. Suitable aromatic compounds also include those which are already partially oxidized to carboxylic acids and their corresponding esters, for example p-toluic acid, methyl p-toluate and p-carboxybenzaldehyde. The process of our invention is particularly suitable for the oxidation of p-xylene to terephthalic acid.

The solvent used in the process is a lower aliphatic monocarboxylic acid preferably containing 2 to 8 carbon atoms, acetic acid being preferred. The solvent may also contain a small amount of water e.g. 1 to 20% by weight.

The molecular oxygen used in the process may be used alone or in admixture with other gases e.g. as air or as a mixture of oxygen and nitrogen with a higher or lower oxygen content than that of air.

The heavy metals used as catalysts include vanadium, chromium, manganese, iron, cobalt, nickel, molybdenum, cerium and zirconium. Particularly suitable is cobalt especially in combination with manganese and possibly also with cerium or zirconium. The amount of the heavy metal present during the oxidation may be subject to wide variation. When cobalt and manganese are the heavy metals the concentration of cobalt may be 400 to 4000 ppm based on solvent and manganese 10 to 4000 ppm. Preferably the cobalt is 1200 to 2500 ppm and the manganese 1 to 30% of the weight of the cobalt. We have found that increasing cobalt favors increased methyl bromide production so the present invention is particularly applicable to processes using high concentrations of cobalt. The heavy metals may be used, for example, in the form of their inorganic or organic acid salts especially the bromides or acetates.

The catalyst also comprises bromine or a bromine-containing compound which acts as an oxidation promoter. The bromine may be provided as bromine itself, as hydrogen bromide, as an organic bromide compound e.g. tetrabromoethane or as an inorganic bromide. Suitable bromides include, for example, bromides of the heavy metals used, for example cobalt or manganese bromides and also bromides for the alkali metals and ammonium bromide.

In any process in which methyl bromide is used or in which it arises as a reaction product there is a need to prevent its loss to the surroundings, firstly because methyl bromide is toxic and secondly because bromine is an expensive element and its loss as methyl bromide can carry a considerable commercial penalty. One difficulty in retrieving the methyl bromide, or its bromine content, arises because the methyl bromide is often a small component of an effluent gas stream so that direct condensation is impractical and expensive. We have now devised a method which converts the bromine content of the methyl bromide to hydrogen bromide and/or elemental bromine both of which compounds particularly hydrogen bromide, are more readily recoverable by absorption techniques.

According to the invention, therefore, a process for the recovery of the bromine content of methyl bromide comprises contacting the methyl bromide with oxygen at an elevated temperature in the presence of an oxidation catalyst and recovering the elemental bromine and/or hydrogen bromide so produced.

The process is particularly applicable to methyl bromide when the latter forms one component in low concentration in a gas stream. For example the concentration of the methyl bromide in the gas stream may be up to 10% particularly 0.001 to 1.0% by volume the balance being made up of gases such as nitrogen, water vapour carbon monoxide and carbon dioxide which are inert under the process conditions and oxygen which is a reaction component. Optionally, a source of hydrogen as hereinafter described may also be present.

The oxidation catalyst is suitably a noble metal catalyst eg silver, rhodium, ruthenium or iridium but is preferably palladium or platinum particularly the latter. The metal is conveniently supported on an inert support such as silica, silica/alumina or, preferably, alumina.

The main-bromine-derived products of the process are elemental bromine and hydrogen bromide the former usually predominating. When the methyl bromide forms one component of a gas stream both products are generally carried away from the catalyst in the gas stream. In order to recover the bromine/hydrogen bromide the gas stream may be extracted with known extractants and for this aspect of the process it is preferred that hydrogen bromide be the major product because it is easier and cheaper to extract hydrogen bromide, eg by scrubbing with water, than it is to extract bromine which requires more expensive extractants. The extraction of the hydrogen bromide may be faciliated by the presence of water vapour in the gas stream containing the methyl bromide/hydrogen bromide because this water dissolves the hydrogen bromide. In some applications eg when the methyl bromide is contained in the effluent gas from an oxidation process water vapour may already be present but otherwise it may deliberately be added. We have also found that significant quantities of hydrogen bromide in the product of the process helps the recovery of any bromine which may be present because bromine is readily soluble in hydrobromic acid.

In order to produce hydrogen bromide as the major product the process may be modified by providing a hydrogen source in the gas stream. The hydrogen source may be chosen from a wide range of compounds and the chief criterion is that of cheapness and ease of use. Molecular hydrogen may be used as may organic compounds containing hydrogen particularly organic compounds which are readily reactive with oxygen. For example the hydrogen source may be a low boiling aliphatic hydrocarbon, particularly an alkane, boiling up to 100° C. eg natural gas consisting mainly of methane or a fuel gas which contains a range of low boiling aliphatic hydrocarbons predominantly propane and butane. Heavier organic compounds may also be used provided that they are capable of being vapourised at the temperature of the methyl bromide oxidation reaction, and this enables hydrogen-containing organic reaction by-products and distillation residues which only have fuel value to be utilised in the process. When the methyl bromide is part of the effluent gas of an oxidation process as hereinbefore described, the gas stream may contain hydrogen-containing organic compounds eg acetic acid (oxidation process solvent) and methyl acetate which may contribute a source of hydrogen. If a source of hydrogen is to be added however a gas such of natural gas or fuel gas is preferred for its ready availability. The amount of the hydrogen source to be used will vary widely according to how much available hydrogen its molecule contains. Thus, when butane is the source less than one mole butane is required for each mole of methyl bromide which is present although generally more butane is used as the maximum amount is not critical to the process except that too much is an unnecessary expense while it is preferred that any hydrogen bromide produced does not remain in contact with the catalyst and oxygen in the absence of a source of hydrogen otherwise oxidation back to elementary bromine may occur. The oxygen which is used in the process may already be present with the methyl bromide eg in an effluent gas from a bromide catalysted oxidation process or it may be added separately eg in the form of air. Excess oxygen over that required for the oxidation process may be present but when palladium is the catalyst, and a source of hydrogen is provided in order to produce hydrogen bromide, it is preferred to maintain a relatively low concentration of oxygen ie about the stoichiometric amount for the oxidation of the methyl bromide eg in an effluent gas stream containing 0.05% by volume methyl bromide and 1% by volume oxygen it is advisable when palladium is the catalyst to reduce the oxygen level by 90% when carrying out the oxidation at 600° C. and by 70% when carrying out the oxidation at 500° C.

The temperature under which the process may be conducted is preferably in the range 200° to 800° C. more preferably 300° to 650° C. and the pressure preferably up to 100 bar, more preferably up to 50 bar. If the methyl bromide is contained in a gas which is the effluent from an oxidation process then it may be convenient to conduct the process of the invention at the pressure of the oxidation process. The catalyst may be in the form of a bed through which the methyl bromide is passed, preferably in continuous manner the contact time being in the range 0.001 to 1000 seconds preferably 0.01 to 100 seconds.

The invention will now be further described with reference to the following Examples.

EXAMPLES

A stream of nitrogen at 1 atmospheric pressure containing 500 ppm v/v methyl bromide with various levels of oxygen and, in some cases, butane (source of hydrogen) was saturated with water vapour at 50° C. and led to a catalyst bed in a silica tube held at constant temperature. The total gas flow was approximately 20 1 hr$^{-1}$ and in each experiment >90% conversion of methyl bromide was achieved. The principal bromine containing products which were detected were hydrogen bromide and molecular bromine. Four examples are given in the table with different catalysts and in the presence and absence of butane. The examples show that whereas the bromine can be recovered as molecular bromine in the absence of a source of hydrogen, such a source is necessary for substantial formation of hydrogen bromide.

| Example | Catalyst | Temperature of Catalyst °C. | Oxygen level % vol. | Butane level % vol. | Br recovered as HBr (as % of total Br recovered |
|---|---|---|---|---|---|
| 1 | 15g 0.4% Pd on γ-alumina | 500 | 1.5 | 0 | <5 |
| 2 | 15g 0.4% Pd on γ-alumina | 500 | 1.0 | 0.18 | >99 |
| 3 | 7g Johnson-Matthey "Honeycat" platinised alumina | 550 | 1.5 | 0 | 5 |
| 4 | 7g Johnson-Matthey "Honeycat" platinised alumina | 550 | 1.1 | 0.16 | >99 |

"Honeycat" is a trademark.

EXAMPLES 5 TO 10

The conditions in Example 3 were repeated except that the temperature was 550° C. and the gas stream contained 1.4% v/v oxygen and the butane level was changed. The results were as follows:

| Example | Butane level in feed ppm (v/v) | Contact time sec. | Me Br Conversion % | Butane Conversion % | HBr as % of total (HBr + Br$_2$) recovered % |
|---|---|---|---|---|---|
| 5 | 400 | 2.1 | >98 | >97 | 63 |
| 6 | 400 | 1.5 | 94 | 96 | 99 |
| 7 | 400 | 1.0 | 89 | 95 | >99 |
| 8 | 220 | 1.4 | 95 | >99 | 69 |
| 9 | 220 | 1.0 | 91 | 96 | 96 |
| 10 | 220 | 0.7 | 87 | 94 | >99 |

We claim:
1. A process for recovering the bromine content of methyl bromide which comprises oxidising a substituted aromatic compound to a carboxylic acid in the presence of a catalyst containing a source of bromine whereby methyl bromide is formed and is present in an effluent gas stream from the process, contacting the effluent gas stream at an elevated temperature with an oxidation catalyst in the presence of oxygen thereby converting the methyl bromide to elemental bromine, hydrogen bromide or mixtures thereof and recovering the bromine, hydrogen bromide or mixtures thereof.

2. A process according to claim 1 in which the methyl bromide is a component of a gas stream in a concentration of up to 10% by volume.

3. A process according to claim 1 in which the oxidation catalyst is a noble metal.

4. A process according to claim 1, 2 or 3 in which the hydrogen bromide is recovered by dissolving it in water.

5. A process according to claim 1 in which the methyl bromide is present in a gas stream and a source of hydrogen is provided in the gas stream.

6. A process according to claim 5 in which the source of hydrogen is molecular hydrogen, natural gas, fuel gas, a hydrogen-containing organic reaction byproduct or hydrogen-containing organic distillation residue.

7. A process according to claim 5 in which the source of hydrogen is methane, butane, propane, acetic acid or methyl acetate.

8. A process according to claim 3 in which the temperature is 200° to 800° C. and the pressure up to 100 bar.

9. A process according to claim 3 in which the catalyst is in the form of a bed through which the methyl bromide is passed in a continuous manner for a contact time in the range 0.001 to 1000 seconds.

10. A process for recovering the bromine content of methyl bromide which is present in an effluent gas stream from a process of oxidizing a substituted aromatic compound to a carboxylic acid in the presence of a catalyst containing a source of bromine whereby methyl bromide is formed which comprises contacting the methyl bromide with oxygen at a temperature in the range of 200° to 800° C. and at a pressure of up to 100 bar in the presence of a platinum catalyst and a source of hydrogen and recovering the hydrogen bromide so produced by dissolving it in water.

* * * * *